Dec. 31, 1940.　　　J. P. SEAHOLM　　　2,226,586
DISK HARROW
Filed May 1, 1939　　　5 Sheets-Sheet 1

Inventor
JOHN P. SEAHOLM
By Carlsen & Hagle
Attorneys

Dec. 31, 1940. J. P. SEAHOLM 2,226,586
DISK HARROW
Filed May 1, 1939 5 Sheets-Sheet 3

Inventor
JOHN P. SEAHOLM

By Carlsen + Hagle
Attorneys

Dec. 31, 1940.　　　J. P. SEAHOLM　　　2,226,586
DISK HARROW
Filed May 1, 1939　　5 Sheets-Sheet 4

Inventor
JOHN P. SEAHOLM
By Carlsen + Hagle
Attorneys

Dec. 31, 1940.  J. P. SEAHOLM  2,226,586
DISK HARROW
Filed May 1, 1939  5 Sheets-Sheet 5

Inventor
JOHN P. SEAHOLM
By Carlsen & Hazle
Attorneys

Patented Dec. 31, 1940

2,226,586

UNITED STATES PATENT OFFICE 2,226,586

DISK HARROW

John P. Seaholm, Moline, Ill., assignor to Minneapolis-Moline Power Implement Company, Minneapolis, Minn., a corporation of Delaware Application May 1, 1939, Serial No. 270,960

27 Claims. (Cl. 55—81)

This invention relates to improvements in disk harrows.

The primary object of the invention is to provide a disk harrow of a wide cut type and by which a wide strip of ground may be worked. It is possible, with the use of tractors as the pulling power, to construct and use disk harrows of almost any desired width and of course a wide harrow will work a greater area of ground per working day than the more common narrow types. However, such harrows have one difficulty and that is that they are extremely unwieldy during transport and cannot be taken from field to field through gates and roads of any usual width. It is an extremely important object of my invention, therefore, to provide a harrow of this type in which the wide spread gangs may when desired be folded or compacted to a width less than, or at most substantially equal to, that of the tractor itself so that the harrow may be taken through any gate opening or road where the tractor itself may travel.

Another object is to provide in a collapsible disk harrow of this nature means for conveniently raising and transporting the harrow, in its folded position, with its disks clear of the ground.

A further object is to provide in a disk harrow of the foregoing desirable characteristics, a number of novel features of frame assembly and construction which include an improved draft means for the disk gangs to prevent or reduce end wear on their bearings thereof, an effective spring hold-down assembly for resisting upward movement at the inner ends of the disk gangs, and holding them to their work, and an improved gang assembly providing for a differential in the rate of rotation of the inner and outer disks of the respective gangs to thus facilitate turning the harrow in the field.

These and other more detailed and specific objects will be disclosed in the course of the following specification, reference being had to the accompanying drawings, in which—

Referring now with more particularity and by reference characters to the drawings, my invention is seen to comprise as its main element a draft frame or frame assembly A and the two disk gangs B and C which are normally (when in use) disposed substantially abreast to each other in oppositely extending and forwardly angled relation.

The draft frame A comprises a central, longitudinally extended main draft member or tongue 15, the outwardly extending side or drag bars or beams 16 and 17 and the diagonally extending brace bars 18 and 19. The bars 16 and 17 are loosely pivoted on vertical axes at 20 at their inner ends between bracket strips 21 welded or secured crosswise to the rear of the tongue 15 and which bracket strips extend at each end substantially from the sides of the tongue as shown. The brace bars 18 and 19 are pivotally connected at their rear ends at 22 to the side bars 16 and 17 at points spaced widely outward from the center of the harrow and from these points the brace bars converge forwardly in a horizontal plane for pivotal connection, again on vertical axes, at 23 between the ends of straps 24 which are welded or otherwise secured crosswise to upper and lower sides of a short tubular sleeve 25 slidable on the tongue 15. Intermediate their ends the brace bars 18 and 19 are divided at 26 into front and rear sections designated at 18a—18b and 19a—19b, and normally these sections are effectively joined and secured in alignment by the fastening means 27 best shown in Fig. 3. Thus the adjacent ends of the front and rear sections of the brace bars 18 and 19 are placed between upper and lower angle bars 28 and 29 and are pivotally connected thereto at spaced points by bolts 30 and 31. Additionally each brace bar end is engaged by removable coupling pins 32 and 33 which are inserted downwardly through the bars and when in place securely lock the brace bars in alignment. However, by withdrawing these pins 32 and 33 the brace bar sections are free to pivot on the bolts 30 and 31 so that these bars may jackknife outwardly at these connected ends as will hereinafter appear.

The frontal end of the tongue 15 has an extension 34 provided with a draft connection 35 by which the harrow may be connected to the drawbar D of the tractor E and, the tongue itself being preferably of tubular material, this extension member 34 may be telescopically arranged in the tongue and length adjustment of the tongue provided by a bolt 38 and spaced bolt openings 39 in a well known manner. Such adjustment will make it possible to vary the clearance between the tractor and harrow as may be required or desired.

The coupling made up of the members 24 and 25 is slidable forwardly and rearwardly on the tongue 15 and may be locked in any selected position against rearward movement by means of a removable pin 40 which may be placed behind the coupling through any one of a series of apertures 41 formed in the tongue as shown.

Alternatively remote control of the adjustment of this coupling may be had by any suitable means adapted to lock the coupling upon the tongue.

The disk gangs B and C are identical in construction and differ only in that the individual disks and certain other parts, as will be hereinafter described, are reversed from one side to the other as required in the operation of the harrow. Each gang is made up in substantially the usual manner of a series of spaced disks 42 arranged along the squared axles 43 and spaced apart thereover by the spacing spools 44 placed over the axles and between the disks. Suitable and conventional means are provided at the ends of the axles to draw the assembly tight and maintain the alignment of the disks, such means including at the inner ends of the respective gangs the rounded, or spherical, bumpers 45 as shown.

Attention is directed to the fact that each disk gang B—C is made up of two complementary inner and outer sections or units 46b—47b, and 46c—47c, and which sections are arranged in axial alignment to together form and constitute the respective gangs. The use of multi-section gangs in such harrows is not new, per se, but my purpose and arrangement thereof is entirely different from any prior constructions with which I am familiar. Each individual gang section is thus connected to the harrow frame for draft purposes, but is not itself directly connected to the adjacent sections. Instead the outer sections 46b and 46c are provided at their inner ends with bumpers 48 quite similar to the aforesaid bumpers 45, but which constitute bearings or bearing knuckles to engage the concaved, dished ends 49 of the bearing members 50 formed at the outer ends of the inner gang sections 47b and 47c. As a result the outer gang sections may turn on their axes at an entirely different rate of speed than the inner gang sections when the harrow is making a turn in the field, and its manipulation is thus made much easier as well as with less wear and tear on the parts. It is for the purpose of affording this advantageous differential in rate of rotation of the disks, as well as to facilitate the handling, shipping, and assembling of the parts, that I provide my individual gang section construction, and it will be noted that no intention whatever is had of providing for relative vertical displacement of the gang sections as has been done heretofore.

Figures 1, 2, 3:
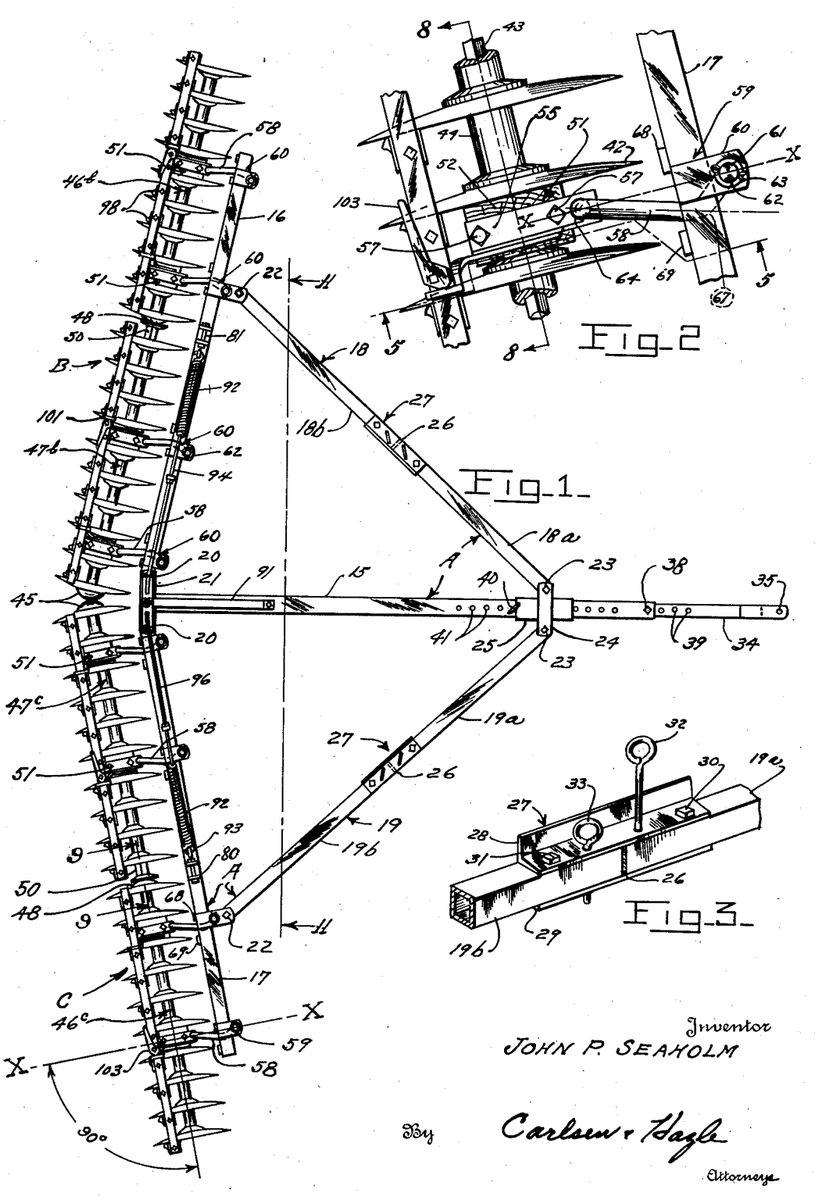
Fig. 1 is a plan view of my improved harrow shown with the gangs disposed at a working angle.
Fig. 2 is an enlarged fragmentary plan view of a section of the right hand disk gang assembly showing the drag link connecting the gang to the forwardly disposed side bars or draft beams.
Fig. 3 is an enlarged perspective view of one of the connections between front and rear sections of the diagonal brace or draft bars.
Figure 5:
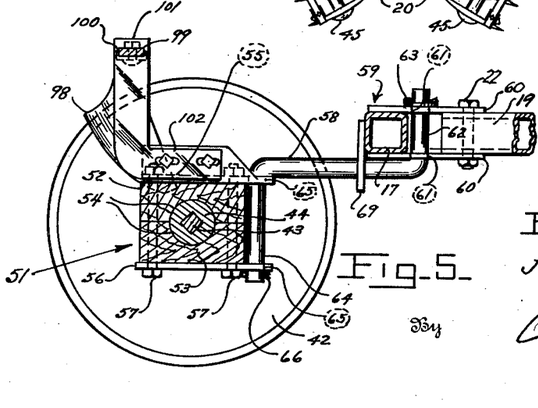
Fig. 5 is a vertical cross section along the line 5—5 in Fig. 2.
Figure 6:
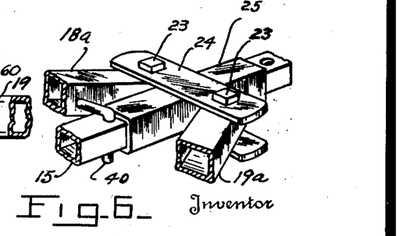
Fig. 6 is a perspective view of the slidable and adjustable connection between the diagonal brace or draft bars and the main tongue or draft member.

Each gang section is provided with a pair of spaced bearings designated generally at 51 and which engage the spools 44 between adjacent disks as best shown in Figs. 2 and 5. These bearings as herein shown are split and made up of upper and lower blocks 52 and 53 provided with mating grooves 54 for the reception of the spools. The blocks themselves may well be made of oil impregnated wood and they are held in assembled relation by upper and lower metal plates 55 and 56 and the clamp bolts 57 extended through the plates and blocks adjacent front and rear ends as clearly shown.

For connecting the disk gangs to the frame A, and more specifically to the side or draft bars 16 and 17, I provide drag links or arms 58 which are of novel and advantageous construction as will now be described. The bars 16 and 17 carry the mounting brackets 59 which are made up of upper and lower straps 60 welded or otherwise secured to the bars and extended forwardly in vertically spaced relationship therefrom. Forwardly of the bars 16 and 17 the straps have vertically aligned and axised openings 61 through which the forward, upwardly turned ends 62 of the drag links 58 are pivotally mounted. Cotter keys 63 retain these ends of the drag links in place so that the links extend rearwardly immediately beneath the bars 16 and 17 toward the disk gangs. At their rearwardly turned ends the drag links are then bent downwardly at 64, and these ends are pivotally mounted in a vertical direction through openings 65 formed in forward extensions of the bearing plates 55 and 56 as shown. This construction obviously forms a draft connection between the gangs and the bars 16 and 17 and permits some endwise play or movement of the disks, in a horizontal plane and with respect to the bars. The purpose and limits of such movement will be presently described. Cotter keys 66 in the lower ends of the drag links complete the connection and hold the parts in assembly.

The next to the outermost brackets 59 are, as shown in Fig. 5 particularly, extended forwardly to receive therebetween the rear ends of the brace bars 18 and 19, and the bolts which form the pivoted connections 22 between these bars and the bars 16 and 17 are passed through the brackets as shown.

Viewed in the horizontal plane, at right angles to their bearing or pivot ends 62 and 64, the drag links 58 are curved or offset toward their frontal end portions as represented at 67, and this curvature is such that the frontal pivots or ends 62 are offset inwardly, with respect to each gang B and C, from the axes of the straight rear end portions of the links. Inner and outer stops 68 and 69 are welded or otherwise suitably secured to the bars 16 and 17 and depend downwardly in spaced relation at opposite inner and outer sides of the drag links to limit the horizontal swinging movement thereof as, and for a purpose which will appear.

Figure 4:
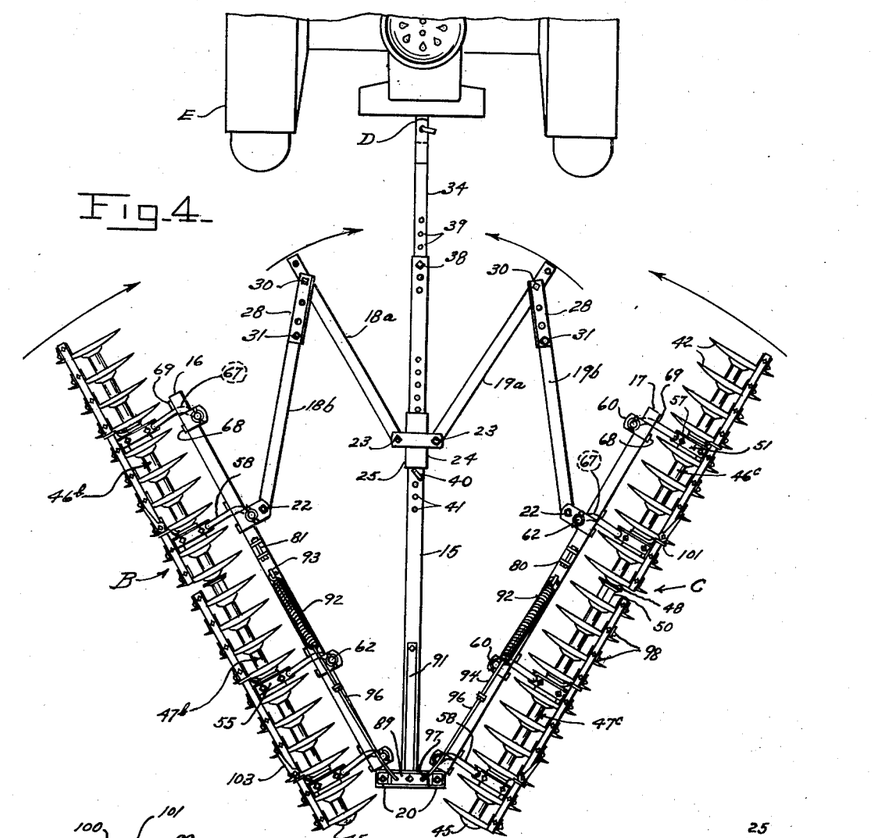
Fig. 4 is a plan view showing the harrow in the process of being folded to transport position, this view also showing a rear portion of the tractor.
Figure 7:
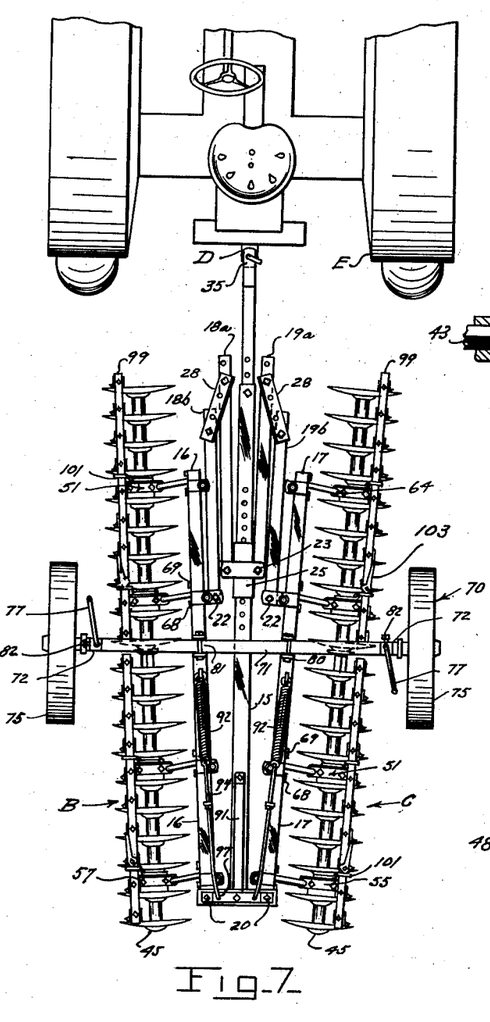
Fig. 7 is a plan view showing the harrow in folded position ready for transport, this view also showing a part of the tractor and a transport truck upon which the harrow is slung or supported for travel.

In operation the gangs B and C are adjusted to the outwardly spread and forwardly angled position shown in Fig. 1, and are held in this position by properly locating the pin 40 in a selected opening 41 in the tongue 15. When drawn across the field by the tractor the disks 42 will now work the soil in the usual manner, but it will be obvious that a wide cut or strip of soil will be worked due to the great overall width of the harrow. Such width in fact may be anything desirable and within reason due to the large tractive force possible with the tractor. However, such width makes it impossible to transport the harrow from field to field through a gate or along a road of any usual width and when such action is desired the harrow must be folded or collapsed to a narrow form. For this purpose the pins 32, 33, and 40 are removed and the brace bars 18 and 19 are thrust outwardly at their adjacent ends 26 until their respective front and rear sections are out of alignment. The tractor is then reversed and run rearwardly, causing these brace bars to fold or jackknife forwardly and outwardly and thrusting the tongue 15 rearwardly. There is thus set up a folding action in which the disk gangs B and C and the side bars 16 and 17 are folded forwardly and inwardly toward the tongue 15 (Fig. 4) and this action is continued until the disk gangs come to a position substantially parallel to each other and to the line of travel and upon opposite sides of the tongue 15. Meanwhile the brace bars 18 and 19 are folded alongside each other between the side bars 16 and 17 and the draft tongue, and the entire frame and gang assembly thus assumes a narrow elongated form as clearly shown in Fig. 7.

Figure 10:
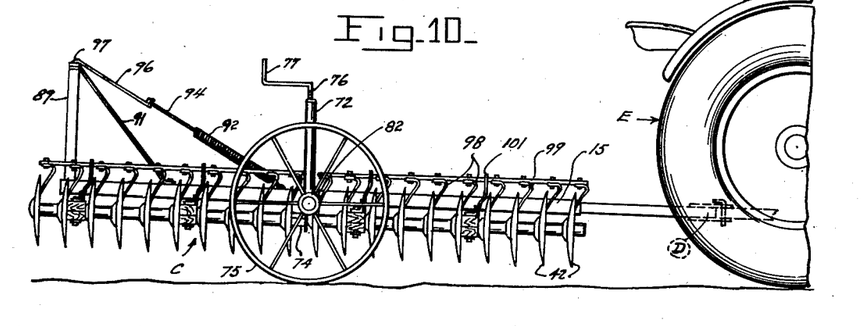
Fig. 10 is a side view of the assembly shown in Fig. 7, showing the harrow in transport condition.
Figure 11:
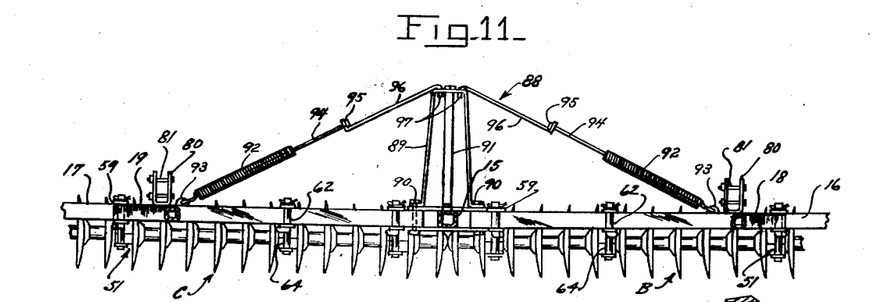
Fig. 11 is a cross section along the line 11—11 in Fig. 1, end portions of the gangs being broken away.

The harrow is now ready for transport, and it will be evident that its width is at this time such that it may pass through any gate or road which will clear the tractor itself. For transport purposes I provide a truck or carriage device 70 (Figs. 10 and 14) comprising a cross bar or support member 71 provided at its ends with vertical, upwardly extending jack housings 72 of tubular, cross section. In the lower ends of these housings 72 are slidably, but not rotatably, mounted the upper ends of the wheel supporting members 73 which carry at their lower ends the outwardly turned horizontal axles 74 for the rotatable reception of the wheels 75. Jack screws 76 provided with crank handles 77 at their upper ends are threaded at 78 downwardly through the upper ends of the housings 72 and have rotatable bearing at 79 on the supporting members 73 within the housing. The side bars 16 and 17 are provided at substantially their midpoints with upwardly extending and opening U-shaped hanger brackets 80, the respective sides of which are located crosswise to the axes of the bars and at such spacing they may receive therebetween the cross member 71 of the transport truck. Removable pins or bolts 81 are placed through the upper end portions of the hanger brackets 80 to bridge the spaces between their sides.

The transport truck thus constructed may be wheeled up over the collapsed or folded harrow so that the wheels 75 are disposed alongside the folded disk gangs and the member 71 spans the harrow in a crosswise direction. The pins 81 being removed, the jack screws 76 are then manipulated to lower the member 71 into the hanger brackets 80, and the pins are replaced above this cross member. The jack screws are then manipulated to urge the housings 72 and cross member 71, constituting the frame of the truck upwardly with respect to the wheels 75 and the harrow will thus be raised clear of the ground (Figs. 10 and 14) and slung or supported between the wheels. In this condition the harrow may be readily transported behind the tractor as will be readily appreciated.

The harrow may be lowered to the ground, when its destination is reached, by unscrewing the jack screws 76 and allowing the truck frame to descend, after which the truck is disconnected from the tractor and wheeled away until its use is again required. With the harrow thus replaced on the ground it may be restored to operative, widespread position by pulling ahead on the tongue 16, meanwhile, or previously, giving the gangs a start on their unfolding movement. This action is continued until the gangs assume the proper working angle, whereupon the coupling 24—25 is pulled forward, if necessary, to straighten out the unfolded brace bars 18 and 19 and the pins 32, 33, and 40 are restored to their proper points to hold the assembly in desired position.

The wheels 75 of the transport truck 70 may be held in alignment for proper travel by the use of material of square or similar multilateral cross section for the housings 72 and members 73, and, if desired, set screws 82 may be threaded through the walls of the housings to bear against the sides of the axle members and aid in maintaining this alignment.

Figure 12:
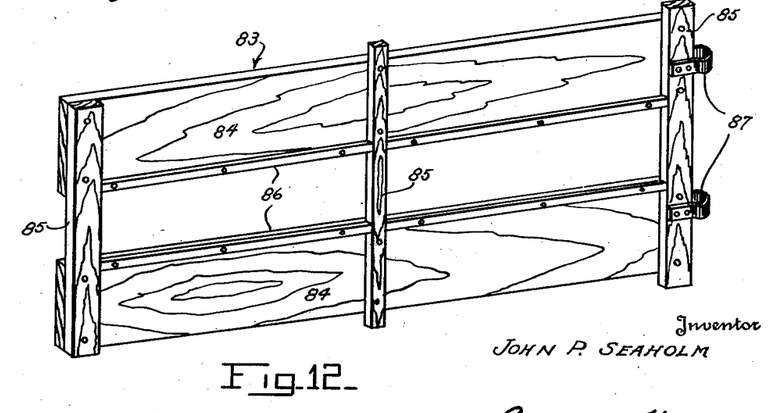
Fig. 12 is a perspective view of a sled or skid upon which the harrow may be supported during transport.

In lieu of this transport truck 70 I may employ a skid or sled designated generally at 83 and made up of runners 84 joined by cross members 85 to form a narrow elongated and rigid frame. In use this skid is laid flat on the ground alongside the folded harrow, the tractor is disconnected from the tongue 15, and is connected by chains or other means (not shown) to a midpoint of the harrow and the harrow is then rolled sideways upon the skid. Stop strips 86 secured to the upper inner sides of the runners 84 hold the disks against rolling off the skid. The tractor is then connected by the same chains, or other draft means, to loops 87 on the frontal cross member 85, and the skid is pulled forward over the ground carrying along the harrow.

In the operative outspread and forwardly angled position of the gangs B and C, as shown in Fig. 1, the bumpers 45 at their inner ends abut each other and provide bearings for the gangs. The endthrust of the disk gangs, being of course inwardly toward the center of the harrow, these bumpers will thus constantly engage each other and mutually support the gangs against relative endwise displacement. However, should the inward thrust of either gang, by a difference in the characteristics of the soil which it is working or from any other cause, be reduced, the two gangs might shift transversely behind the side bars 16 and 17 upon the pivotal connections formed by the drag links 58. but such motion will not interfere with the operation of the harrow and will be confined within reasonable limits by the stops 68 and 69 which will contact the drag links.

An important and novel feature of my invention will now be described. The most commonly used and effective angle of the gangs will be about that shown in Fig. 1, and the spacing (outwardly) of the brackets 59 relative to the disk bearings 51 is such that at this angle of the gangs the pivots 62 and 64 at the ends of the drag links 58 will be disposed in a plane, or on a line X—X (Figs. 1 and 2), at right angles to the axes of the gangs. The contact of the bumpers 45 will maintain this alignment, and as a result the pulling force exerted between the bars 16 and 17 and the respective disk gangs will be transmitted on a line at right angles to the gangs and end thrust on the bearings 51 will be substantially reduced. It is this end thrust on the bearings, brought about by the angular lines of force transmitted to the gangs in all former harrows with which I am familiar, which has caused such undue wear on the bearings and required their frequent replacement, and these difficulties are eliminated to large extent in my construction.

As the harrow is driven rearwardly in order to fold the gangs, there is of course a tendency of the gangs to shift outwardly with respect to the bars 16 and 17, and this action will also take place to some extent in the side to side shifting of the gangs in use. The stops 68—69 will limit this movement to the extent that the disk edges will never strike the bars 16 and 17 and become dulled by such contact. However, the curvature of the drag links 58, designated at 67, is important in that it will prevent the disks from contacting these links also, this being clearly shown in Fig. 4. Straight links would quite obviously be unsatisfactory for this reason.

The working angle of the gangs B and C may be adjusted by removing the pin 40 and moving the tractor forwardly or rearwardly to cause slight folding or unfolding movements of the parts and then replacing the pin. In this manner too the gangs may be swung back to an axially aligned position for transport within and around the field in a well known manner, the drag links having sufficient range of movement for this purpose.

There is, as well known to those skilled in the art, a tendency for the inner ends of the disk gangs to move upwardly due to end thrust and such action, if left unresisted, would cause an uneven penetration of inner and outer disks. For this purpose I provide a spring actuated hold-down device designated generally at 86 and which comprises a single, centrally located standard, or arm member 89 supported vertically from the rear straps 21 and which thus constitutes a part of the frame rather than an extension or unitary part of the disk gangs per se. This standard has its legs secured at 90 to the straps 21 and is braced in vertical position by a forwardly and downwardly directed brace 91 to stand entirely rigid. Heavy retractile coil springs 92 are connected at 93 to the side or draft bars 16 and 17 at points spaced well outwardly toward their outer ends, and the inner ends of these springs are terminated in screw threaded rods 94 making adjustable connection with the springs and connected by heads 95 with links 96 hooked at their ends at 97 for pivotal connection with the standard 89 at its upper end.

The springs 92 thus exert pulling forces in inwardly and upwardly angled directions from the outer ends of the bars 16 and 17, and have a tendency to elevate these outer ends as will be apparent. This action causes a corresponding downward pressure to be exerted upon the center or inner ends of the bars, and this force is transmitted of course through the drag or draft connections to the disk gangs to counteract any tendency of the gangs to rise at their inner ends. The effects of the end thrust upon the gangs are thus entirely removed, and the disk gangs are caused to run at even depth across the entire width of the harrow. The tension of the springs may be adjusted by the screw threaded rods 94 according to the nature and consistency of the soil being worked and the angle at which the gangs are set. The arrangement is such obviously that no interference whatever is caused with the folding and unfolding movement of the parts.

Each individual disk 42 of each gang section is provided with a scraper 98 and the scrapers are secured to and depended from scraper bars 99 extended along upper sides of the gangs as shown. These scraper bars are slidably mounted through slots 100 in bracket arms 101 secured to flanged sides 102 of the upper bearing plates 55, and the bars may be moved endwise through these arms to engage or disengage the scrapers to and from the disks by cam levers 103 pivoted to the bars and having an eccentric engagement with the upper ends of the arms as will be apparent.

Figure 8:
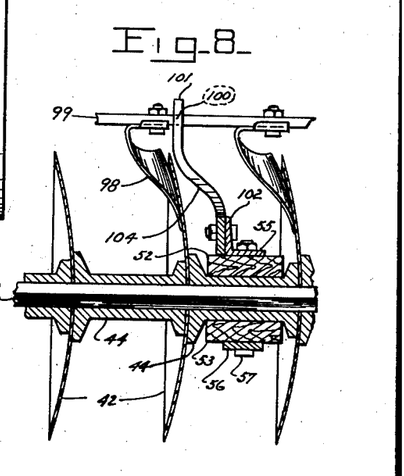
Fig. 8 is a vertical section along the line 8—8 in Fig. 2.
Figure 9:
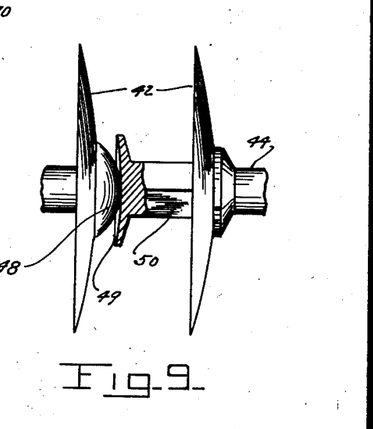
Fig. 9 is an enlarged and vertical section along the line 9—9 in Fig. 1.

Attention is directed, in Fig. 8, to the offset curvature 104 of the bracket arms 101 which spaces these arms from the concave sides of the disks and from the scrapers to prevent the formation of an obstruction which might collect trash in the operation of the harrow. The shape of the scrapers 98 themselves, by which their forword and upper edges stand well away from the disks, also aids in this very desirable object.

Weight boxes of usual form (not shown) may obviously be supported by the arms 101 above the disks for the usual purpose.

Figures 13, 14:
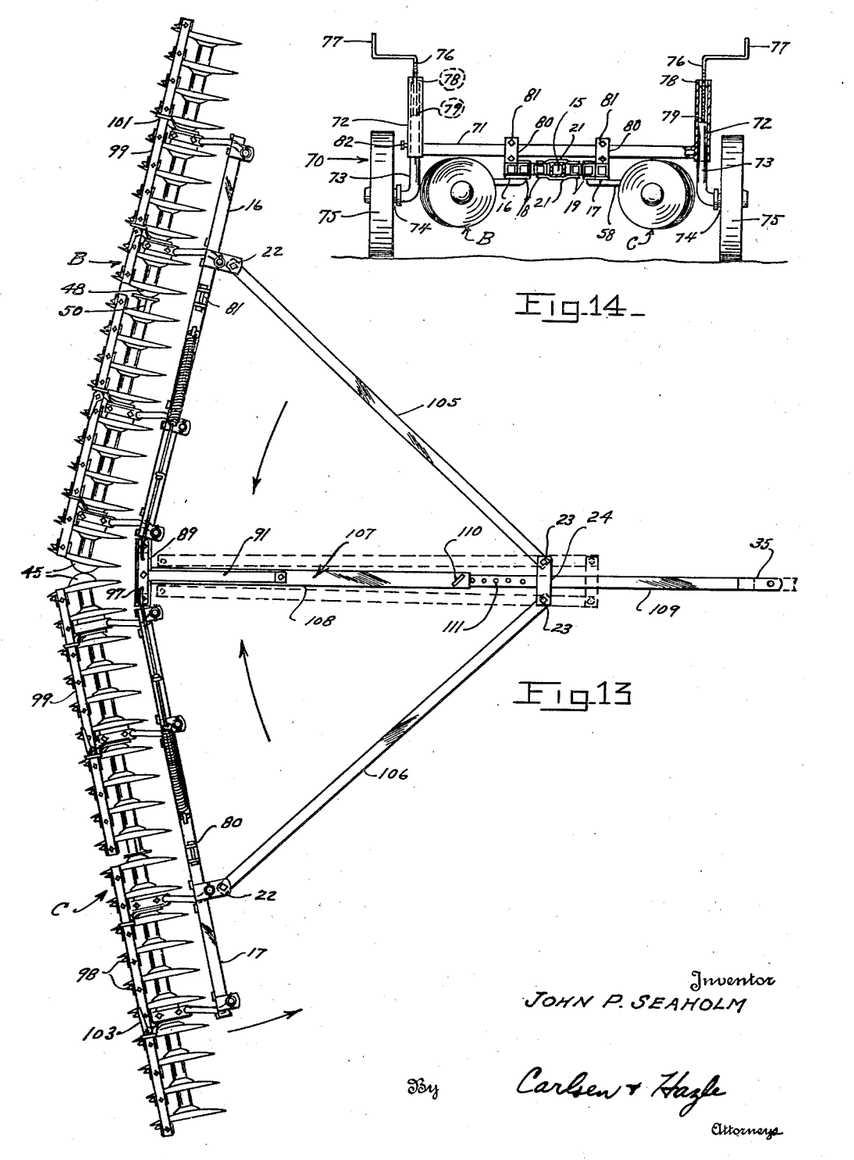
Fig. 13 is a plan view of a harrow similar to that shown in Fig. 1, but employing a slightly different frame assembly in which the diagonal brace bars are of one piece construction and fold slightly differently as shown in dotted lines.
Fig. 14 is a rear end view of the harrow in folded transport position and showing details of the transport truck and arrangement.

A slightly modified frame arrangement is shown in Fig. 13, the only difference being in the construction and operation of the diagonal brace bars, and in the construction of the main draft tongue. All other parts are identical to those hitherto described and are accordingly designated by the same reference characters.

In this assembly the brace bars 105 and 106 are pivotally connected, as before, at 22 and 23 to the side bars 16 and 17 and the straps 24, but instead of being of sectional construction these brace bars are each of one single piece of the proper length. For this reason then a somewhat different action obtains in the folding operation in which the bolts or pins forming the rear pivots 22 are first removed and the forward ends of the brace bars slid forwardly until the brace bars may be folded straight inwardly at their rear ends alongside the center tongue as shown in dotted lines. After this the folding operation is exactly as heretofore described, and the slight differences occasioned in both folding and unfolding, occasioned by the use of these unitary brace bars will, it is thought, be readily understood.

The main draft tongue or bar 107 is somewhat differently arranged in that it comprises a rear section 108 connected to the side bars 16 and 17 and a forward section 109 having the draft connection 35 and which is telescopically arranged with respect to the rear section. A pin 110 may be inserted through any aligned set of openings 111 in these tongue sections and the straps 24 are here secured directly to the forward section 109. Thus by removing the pin 110 and moving the tractor forwardly and rearwardly, the angle of the gangs B and C may be varied as desired, and also the foregoing adjustment, to permit unfolding of the brace bars 105 and 106, may be carried out.

Obviously this embodiment of my invention retains all advantages and features of construction and operation as hereinbefore described, and further description is apparently not here required.

I attach the greatest importance to the forwardly and inwardly folding arrangement of the gangs, as this quite evidently provides the maximum of facility and convenience in the actual operation of the harrow. The assembly is simple and durable mechanically and extensive tests have found it to fully meet the demands of the most rigorous service.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A disk harrow comprising a draft member, and disk gangs operatively connected to the draft member for folding movement about the connections in a forward direction from outwardly spread working position to substantially parallel positions.

2. In an implement adapted to be propelled forwardly or rearwardly by a draft force, the combination of two earth working tool gangs supported and connected for forward folding movements about inner pivots from outwardly extended working angles to folded substantially parallel positions, and for return movement from substantially said folded position to working angle by forward movement of the implement.

3. A disk harrow structure comprising a pair of disk gangs foldable about inner end connections from wide spread working positions forwardly to substantially parallel positions for transport purposes.

4. In a disk harrow, the combination of a pair of disk gangs adapted for positioning in outwardly spread relation for soil working purposes, and means connecting the gangs for forward folding movement to substantially parallel positions in advance of the positions the gangs occupy when in such spread positions.

5. In a disk harrow, the combination of a pair of disk gangs normally disposable in oppositely and outwardly extending relation and foldable from this position forwardly and inwardly about inner end pivots to substantially parallel positions to thereby reduce the overall width of the harrow for transport purposes.

6. In a disk harrow, a pair of elongated disk gangs adapted for positioning in outwardly extending relation and with their outer ends swingable forwardly about pivot centers disposed adjacent their inner ends to thereby bring the gangs into substantially parallel positions.

7. In a disk harrow, a pair of disk gangs normally extended in wide spread relation and pivotally connected at forwardly spaced points adjacent said inner ends for forward folding movement to closely spaced positions.

8. In a disk harrow, a pair of disk gangs normally extended in wide spread relation and pivotally connected forwardly of their inner ends for forward folding movement to closely spaced positions substantially parallel to the line of travel of the harrow.

9. In a disk harrow, a pair of disk gangs normally extended in outwardly spread positions, and the said gangs being pivotally connected on forwardly and transversely spaced pivot centers for forward folding movement to substantially parallel positions.

10. In a disk harrow, a draft member, a pair of disk gangs connected to the draft member and normally disposable in outwardly spread positions, said gangs having connections with said draft member on forwardly located and transversely spaced pivot centers permitting forward swinging movements of the gangs to positions alongside the draft member.

11. In a disk harrow, the combination of a longitudinally extended draft member, and a pair of disk gangs having pivotal connections with the rear portion of the draft member for forward folding movement from working position to positions along opposite sides of the draft member.

12. In a disk harrow, the combination of a draft frame including a fore and aft extended tongue member, side members pivotally connected at inner ends to the rear portion of the tongue member for forward folding movement from outwardly extending positions to folded positions alongside the tongue member, and disk gangs connected to the said side members and movable therewith.

13. In a disk harrow, the combination of a draft frame including a fore and aft extended tongue member, side members pivotally connected at inner ends to the rear portion of the tongue member for forward folding movement from outwardly extending positions to folded positions alongside the tongue member, disk gangs operatively connected to the side members and foldable therewith, and brace members foldably connected between the tongue and side members.

14. A disk harrow comprising a draft tongue, draft beams pivotally connected at their inner ends to the rear of the tongue and foldable forwardly about said pivots to positions along opposite sides of the tongue, disk gangs operatively connected to the draft beams so as to be movable therewith when the draft beams are folded, and collapsible brace members extended diagonally from the tongue to outwardly spaced portions of the draft beams.

15. A disk harrow comprising a draft tongue, draft beams pivotally connected at their inner ends to the tongue and foldable forwardly about said pivots from outwardly spread positions to positions in substantial parallelism with the draft tongue, disk gangs connected to the draft beams, sectional braces pivotally connected at opposite ends to the tongue and to outwardly spaced portions of the draft beams, the said braces being constructed to jackknife as the beams fold forwardly, and means for releasably locking the braces in operative positions.

16. A disk harrow comprising a draft tongue, draft beams pivotally connected at their inner ends to the rear of the tongue and swingable forwardly about said pivots from outwardly and oppositely extending positions to positions alongside the tongue, disk gangs connected to the draft beams and foldable therewith, brace members pivotally connected to the draft beams at points spaced from their pivoted ends and extended in forwardly converging relation to the tongue, a forwardly and rearwardly adjustable member associated with the tongue and pivotally connected to the forward ends of the brace member, and the said brace members being constructed and arranged for folding action responsive to the said folding movement of the draft beams and disk gangs to thereby also assume positions alongside the tongue.

17. In a disk harrow, the combination of a pair of disk gangs arranged for forward swinging movement from outwardly extended working angles to substantially parallel transport positions, and a transport device for supporting the disk gangs clear of the ground in said transport positions during travel movement.

18. A disk harrow adapted to be propelled by a draft force, and comprising a pair of disk gangs constructed and arranged for forward folding movement from outwardly spread working angles to substantially parallel transport positions, and a wheeled transport device adapted for detachable connection to the disk gangs in their folded positions to thereby support the gangs for travel movement, the said transport device including means for jacking up the disk gangs clear of the ground.

19. In a disk harrow, the combination including an elongated disk gang made up of component sections, draft means connected to the gangs and restraining the sections thereof against relative angular displacement in vertical directions, and complementary bearing elements at the adjacent ends of the gang sections mutually supporting the gangs and transmitting end thrust therebetween while enabling either gang to rotate independently of the other and to move off-center with respect to the other.

20. In a disk harrow the combination comprising a pair of disk gangs arranged in outwardly and oppositely extending and mutually reacting relation, draft means supported lengthwise of and in horizontally spaced relation to the disk gangs, the said draft means being connected to the gangs to rise and fall therewith, and spring mechanism supported centrally from the draft means and operatively connected to exert upward and inward angular forces upon the outer ends of the draft means and thereby counteract upward thrust at the center caused by reaction of the disk gangs.

21. In a disk harrow, the combination of two oppositely extending disk gangs, draft beams disposed forwardly and connected to the disk gangs for movement therewith, a centrally disposed main draft member connecting the draft beams at their inner ends, a spring supporting member erected vertically from the center of the draft member and rigid with respect to said member, and retractile coil springs connected between the said supporting member and outer portions of the draft beams to exert upward forces on the outer end of the beams and corresponding downward forces at the inner ends thereof.

22. In a disk harrow, the combination of a pair of oppositely extending disk gangs, a draft mechanism including a center member and side members movably connected at their inner ends thereto, the said side members extending outwardly and being connected to the disk gangs for movement therewith, a standard supported rigidly in upright position from the center member draft assembly, and spring acting mechanism extended angularly from the upper end of the standard to outer portions of the side members for exerting adjustable downward pressure at the inner ends of said side members and connected disk gangs.

23. In a disk harrow, a pair of oppositely extending disk gangs, draft members connected to the disk gangs and extending lengthwise with respect thereto, the inner end portions of the draft members being connected for limited flexible movement to thereby rise and fall with the disk gangs, and adjustable spring actuated mechanism supported centrally above the draft members and outwardly connected thereto for resisting upward thrust at the center of the disk gangs.

24. In a disk harrow, the combination of a pair of oppositely extending disk gangs, draft members connected to the gangs for movement therewith, the said draft members being pivotally connected at inner ends for forward folding movement of the members and disk gangs, a supporting member supported in a generally upright position from the center of the draft members, spring acting means connected to outer portions of the draft members and extending upwardly and inwardly to the supporting member and operative to resist upward thrust at the center of the disk gangs, the said spring acting means having pivotal connection with said supporting means for forward folding movement with the said draft members and disk gangs.

25. A disk harrow comprising a draft frame including oppositely extended side beams, disk gangs arranged lengthwise with respect to the side beams, links pivotally connecting the beams and gangs for lengthwise shifting movement of the gangs relative to the beams, and stop means carried by the beams for engaging the said links and limiting said shifting movement of the disk gangs.

26. A disk harrow comprising a draft frame including oppositely extended side beams, disk gangs arranged lengthwise with respect to the side beams, links pivotally connecting the beams and gangs for lengthwise shifting movement of the gangs relative to the beams, and stop means carried by the beams for engaging the said links and limiting shifting movement of the disk gangs short of that which would cause the disks to contact the beams, the said links being curved intermediate their ends and in the horizontal plane to avoid contact with the edges of the disks.

27. In a disk harrow, the combination of a disk gang and draft means therefor, and the said gang comprising separate sections adjacent ends of which are provided with contact members having mutually supporting bearing engagement whereby either gang may rotate at a differential in speed with respect to the other, one of said contact members having a concave surface and the other of said members having a convex surface in contact with the said concave surface of the other member.

JOHN P. SEAHOLM.